United States Patent
Jecmenjak-Urban et al.

(10) Patent No.: US 12,454,320 B2
(45) Date of Patent: Oct. 28, 2025

(54) WHEEL COVER APPARATUS, VEHICLE HAVING A WHEEL COVER APPARATUS AND METHOD FOR OPERATING SUCH A VEHICLE

(71) Applicant: Bayerische Motoren Werke Aktiengesellschaft, Munich (DE)

(72) Inventors: Jurij Jecmenjak-Urban, Garching bei Munich (DE); Andreas Mayer, Munich (DE); Ludwig Seethaler, Erdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 226 days.

(21) Appl. No.: 18/274,254

(22) PCT Filed: May 23, 2022

(86) PCT No.: PCT/EP2022/063849
§ 371 (c)(1),
(2) Date: Jul. 26, 2023

(87) PCT Pub. No.: WO2022/248385
PCT Pub. Date: Dec. 1, 2022

(65) Prior Publication Data
US 2024/0092431 A1     Mar. 21, 2024

(30) Foreign Application Priority Data
May 27, 2021    (DE) .................... 10 2021 113 699.7

(51) Int. Cl.
*B62D 35/00*     (2006.01)
*B62D 25/18*     (2006.01)

(52) U.S. Cl.
CPC ............ *B62D 25/186* (2013.01); *B62D 35/00* (2013.01)

(58) Field of Classification Search
CPC ...... B62D 25/18; B62D 37/02; B62D 25/186; B62D 35/00; B62D 25/08; B62D 25/12; B62D 25/16; B62D 25/182
(Continued)

(56) References Cited

U.S. PATENT DOCUMENTS

| | | | | |
|---|---|---|---|---|
| 2,277,488 | A * | 3/1942 | Haltenberger | B62D 25/184 280/848 |
| 8,424,956 | B2 * | 4/2013 | Stimel | B62D 25/186 296/180.1 |

(Continued)

FOREIGN PATENT DOCUMENTS

| | | |
|---|---|---|
| CN | 1791729 A | 6/2006 |
| CN | 106163905 A | 11/2016 |

(Continued)

OTHER PUBLICATIONS

International Search Report (PCT/ISA/210) issued in PCT Application No. PCT/EP2022/063849 dated Sep. 16, 2022 with English translation (4 pages).

(Continued)

*Primary Examiner* — James A Shriver, II
*Assistant Examiner* — Hilary L Johns
(74) *Attorney, Agent, or Firm* — Crowell & Moring LLP

(57) ABSTRACT

A wheel cover apparatus for a vehicle includes an upper planar section for at least partially covering the wheel outer side of a steerable wheel, a lower planar section for at least partially covering the wheel outer side of the steerable wheel, an adjustment device for adjusting a position and/or orientation of the upper planar section and a positioning device for positioning the lower planar section. The upper planar section can be arranged on a body of a vehicle so as to be pivotable about a first pivot axis extending in the longitudinal direction of the vehicle. The upper planar (Continued)

section and the lower planar section are connected to each other so as to be pivotable about a second pivot axis extending in the longitudinal direction of the vehicle. The upper planar section is coupled to the adjustment device in such a manner that, in a functional installed state in the vehicle, the upper planar section is movable relative to the wheelhouse by means of the adjustment device. The positioning device is a traction means transmission.

10 Claims, 3 Drawing Sheets

(58) Field of Classification Search
    USPC .......................................................... 280/160
    See application file for complete search history.

(56) References Cited

U.S. PATENT DOCUMENTS

| | | | |
|---|---|---|---|
| 8,979,102 | B1 | 3/2015 | Prentice |
| 10,494,033 | B2* | 12/2019 | Haeseker ............. B62D 25/182 |
| 12,304,572 | B2* | 5/2025 | Chevar .................. B62D 25/16 |
| 2007/0084016 | A1 | 4/2007 | Bommelmann et al. |
| 2020/0283072 | A1* | 9/2020 | Ballarin .................... B60B 7/00 |
| 2022/0024246 | A1* | 1/2022 | Smith .................... B60B 7/0026 |
| 2023/0109675 | A1* | 4/2023 | Chevar .................. B62D 35/00 |
| | | | 296/180.1 |
| 2024/0149957 | A1* | 5/2024 | Jansen .................... B62D 25/18 |
| 2025/0091381 | A1* | 3/2025 | Smith ..................... B60B 7/068 |

FOREIGN PATENT DOCUMENTS

| | | |
|---|---|---|
| CN | 109941355 A | 6/2019 |
| DE | 10 2005 054 069 A1 | 5/2007 |
| DE | 10 2012 021 851 A1 | 5/2014 |
| DE | 10 2016 205 426 A1 | 10/2017 |
| FR | 2 571 013 A1 | 4/1986 |
| JP | 2009-234331 A | 10/2009 |

OTHER PUBLICATIONS

German-language Written Opinion (PCT/ISA/237) issued in PCT Application No. PCT/EP2022/063849 dated Sep. 16, 2022 (5 pages).

German-language Search Report issued in German Application No. 10 2021 113 699.7 dated Feb. 17, 2022 with English translation (12 pages).

English Translation of Chinese-language Office Action issued in Chinese Application No. 202280009289.6 dated Jul. 19, 2025 (7 pages).

* cited by examiner

WHEEL COVER APPARATUS, VEHICLE HAVING A WHEEL COVER APPARATUS AND METHOD FOR OPERATING SUCH A VEHICLE

BACKGROUND AND SUMMARY

The present invention relates to a wheel cover apparatus for a vehicle, to a vehicle having such a wheel cover apparatus, and to a method for operating such a vehicle.

On front axles of two-track vehicles, in particular two-track passenger cars, owing to the space requirement of the steerable wheels during steering and springing, a relatively large cutout is generally required in the wheel arch or a relatively large wheel arch having a relatively large gap between the wheel and the wheel arch is required, in order to ensure the necessary clearance between the wheel and the body. However, the large gap between the wheel and the wheel arch has a disadvantageous effect on the aerodynamics, in particular the air resistance, and on the visual appearance of the vehicle.

To improve the aerodynamics and the visual appearance, it is known from the prior art to attach a wheel arch cover to the vehicle, said wheel arch cover at least partially concealing a steerable wheel which is arranged in a wheel arch. However, on account of the space requirement of the steerable wheels during steering, it is necessary for the wheel arch cover to move together with the steerable wheel to be concealed in dependence on a wheel steering angle.

FR 2 571 013 A1 describes a wheel arch cover for a wheel arranged in a wheel arch of a vehicle. The wheel arch cover comprises an upper covering element and a lower covering element which are connected to one another so as to be pivotable with respect one another about a pivot axis extending in a vehicle longitudinal direction. The upper covering element is mounted on a body of the vehicle so as to be pivotable about a further pivot axis extending in the vehicle longitudinal direction. The lower covering element is positioned by means of a four-joint arrangement. The four-joint arrangement comprises two connecting webs. The connecting webs are each rotatably fixed at a first end to the body of the vehicle. A first of the connecting webs is connected at the second end to the upper covering element in a rotationally fixed manner. The second connecting web is rotatably connected at the second end to the lower covering element. By means of an adjusting device, which is connected to the upper covering element, the upper covering element can be pivoted about the further pivot axis, wherein a position of the lower covering element can be controlled by means of the four-joint arrangement.

In order to position the lower covering element, two connecting webs which form a four-joint arrangement are thus required in the wheel arch cover from FR 2 571 013 A1. The four-joint arrangement has a large installation space requirement in the wheel arch. Furthermore, the connecting webs in each case require a connection point which is fixed to the vehicle or to the body. The wheel arch cover known from FR 2 571 013 A1 is thus of complex construction and requires a lot of installation space in the wheel arch.

Proceeding from the wheel arch cover described in FR 2 571 013 A1, it is the object of the present invention to provide a wheel cover apparatus for a vehicle comprising a positioning device for positioning a lower planar (areal) portion relative to an upper planar (areal) portion, said wheel cover apparatus having a small installation space requirement in the wheel arch and being of simple design in terms of construction, in particular comprising as few connection points to the body as possible. Furthermore, it is the object of the present invention to provide a vehicle comprising such a wheel cover apparatus and a method for operating such a vehicle.

This object is achieved by means of the wheel cover apparatus, the vehicle, and the method, in accordance with the independent claims.

According to the invention, provision is thus made of a wheel cover apparatus for a vehicle comprising an upper planar portion for at least partially covering a wheel outer side of a steerable wheel, which is at least partially arranged in a wheel arch of the vehicle, a lower planar portion for at least partially covering the wheel outer side of the steerable wheel, an adjusting device for adjusting a position and/or orientation of the upper planar portion and a positioning device for positioning the lower planar portion. The upper planar portion can be arranged on a body of the vehicle so as to be pivotable about a first pivot axis extending in a vehicle longitudinal direction. The upper planar portion and the lower planar portion are connected to one another so as to be pivotable about a second pivot axis extending in the vehicle longitudinal direction. In a functional installation state, the upper planar portion can be moved relative to the wheel arch by means of the adjusting device. The positioning device is a traction mechanism drive, in particular a belt drive.

The core concept of the invention is thus to position the lower planar portion relative to the upper planar portion and the body by means of the traction mechanism drive. Owing to the use of the traction mechanism drive as the positioning apparatus, a vehicle connection point is omitted in comparison with the four-joint arrangement known from the prior art. In addition, the positioning device of the wheel cover apparatus according to the invention requires a small installation space in the wheel arch.

In a preferred embodiment of the wheel cover apparatus according to the invention, the positioning device comprises a first shaft, a second shaft and a traction mechanism or a drive belt, in particular a toothed belt. The first shaft can be mounted on the body of the vehicle in a rotationally fixed or rotationally rigid manner and serves as guide for the traction mechanism. The traction mechanism is arranged on the first shaft and the second shaft and wraps around said shafts. The lower planar portion is connected to the second shaft in a rotationally fixed or rotationally rigid manner.

During pivoting of the upper planar portion about the first pivot axis, the second shaft is thus rotated counter to a pivoting direction of the upper planar portion. Due to the rotation of the second shaft, which is connected to the lower planar portion in a rotationally fixed manner, the lower planar portion is pivoted counter to the pivoting direction of the upper planar portion relative to the upper planar portion. A position of the lower planar portion relative to the upper planar portion can thus be precisely controlled by means of the positioning apparatus.

The second shaft is, for example, mounted on or connected to the upper planar portion in a rotatable manner.

In a preferred embodiment of the wheel cover apparatus according to the invention, the first shaft and the second shaft have the same diameter. Thus, during a pivoting movement of the upper planar portion by a determined angle, the lower planar portion is pivoted in the opposite direction by this determined angle. In sum, a resulting pivot angle of the lower planar portion relative to the vehicle body of zero degrees is thus produced. Parallel guidance of the lower planar portion relative to the body is thus ensured.

In an exemplary embodiment of the wheel cover apparatus according to the invention, the positioning device comprises a tensioning roller for tensioning the traction mechanism on the first shaft and the second shaft. The tensioning roller allows damping of vibrations in the traction mechanism. It is thus possible for a tension of the traction mechanism on the first shaft, the second shaft and the tensioning roller to be kept low, without negatively influencing the noise characteristics of the positioning device. The low tension of the traction mechanism prolongs the service life thereof.

By way of example, the first shaft, the second shaft and the tensioning roller define a triangle.

The tensioning roller may be rotatably mounted on the upper planar portion.

In an exemplary embodiment of the wheel cover apparatus according to the invention, the upper planar portion can be pivotably mounted on the body of the vehicle by means of a connecting web. By means of the connecting web, the wheel cover apparatus can be adapted to the installation space conditions of the vehicle, in particular of the wheel arch.

In a preferred embodiment of the wheel cover apparatus according to the invention, the connecting web can be pivotably connected at a first end to the body. The second shaft is rotatably arranged at a second end of the connecting web.

The adjusting device may be rotatably connected to the connecting web. It is thus possible for an adjusting movement generated by the adjusting device to be transmitted to the upper planar portion via the connecting web.

The tensioning roller is, for example, rotatably mounted on the connecting web, in particular on a side of the connecting web facing away from the upper planar portion.

Furthermore, the invention provides a vehicle comprising an above-described wheel cover which at least partially covers a wheel outer side of a steerable wheel which is at least partially arranged in a wheel arch of the vehicle.

Furthermore, the invention provides a method for operating an above-described vehicle, comprising the following steps: detecting an operating state of the vehicle; determining whether pivoting of the upper planar portion of the wheel cover apparatus about the first pivot axis is required in dependence on the detected operating state of the vehicle; and if it is determined that the pivoting of the upper planar portion of the wheel cover apparatus is required, pivoting the upper planar portion by means of the adjusting device.

The invention will be explained in more detail below on the basis of an exemplary embodiment illustrated in the drawings.

DETAILED DESCRIPTION OF THE DRAWINGS

Figure 1:
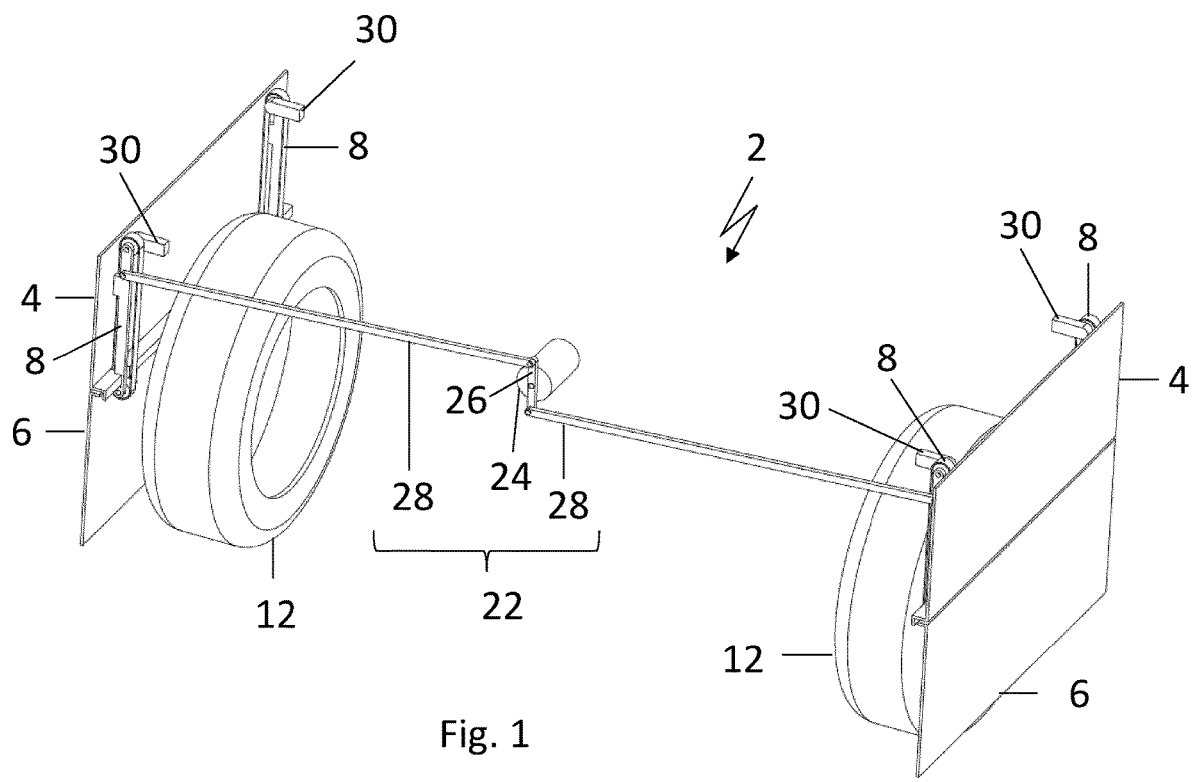
FIG. 1 is a perspective view of a wheel cover apparatus according to an embodiment of the invention in a starting position with two steerable wheels of a motor vehicle which are oriented in the vehicle longitudinal direction.
Figure 2:
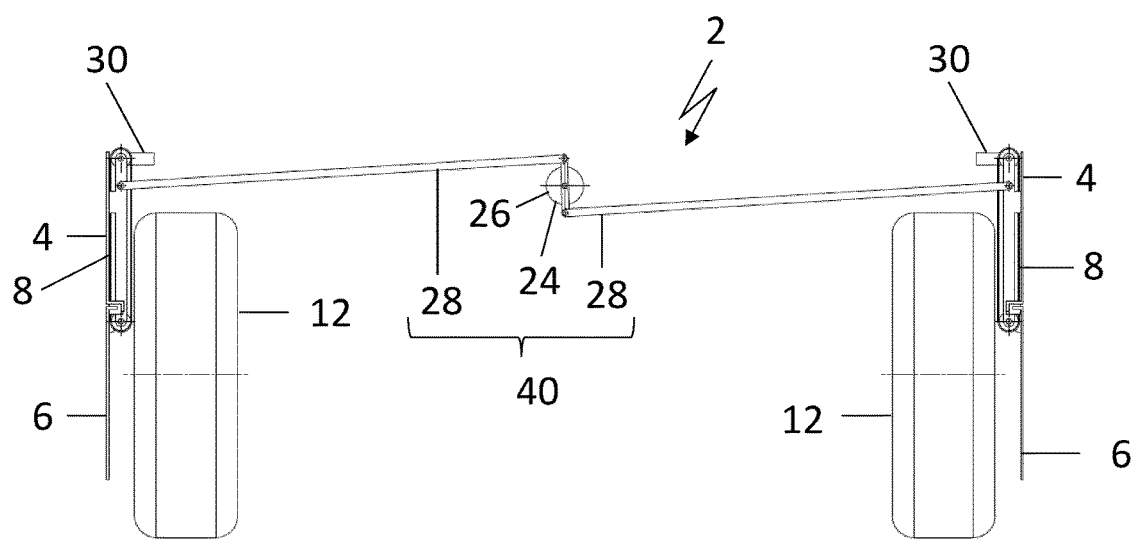
FIG. 2 is a rear view of the wheel cover apparatus and of the steerable wheels from FIG. 1.
Figure 3:
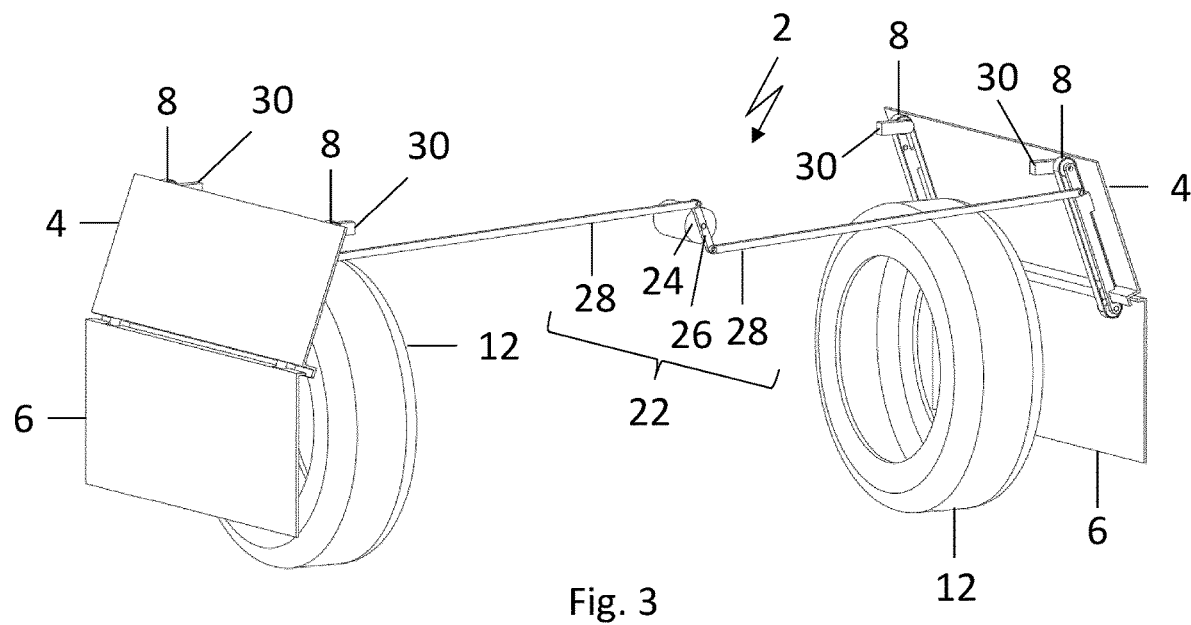
FIG. 3 is a further perspective view of the wheel cover apparatus and of the steerable wheels from FIG. 1, the wheel cover apparatus having been pivoted and the steerable wheels having been steered inward.

In FIGS. 1 to 3, a wheel cover apparatus 2 is illustrated together with two steerable wheels 12 of a vehicle (not illustrated).

Figure 4:
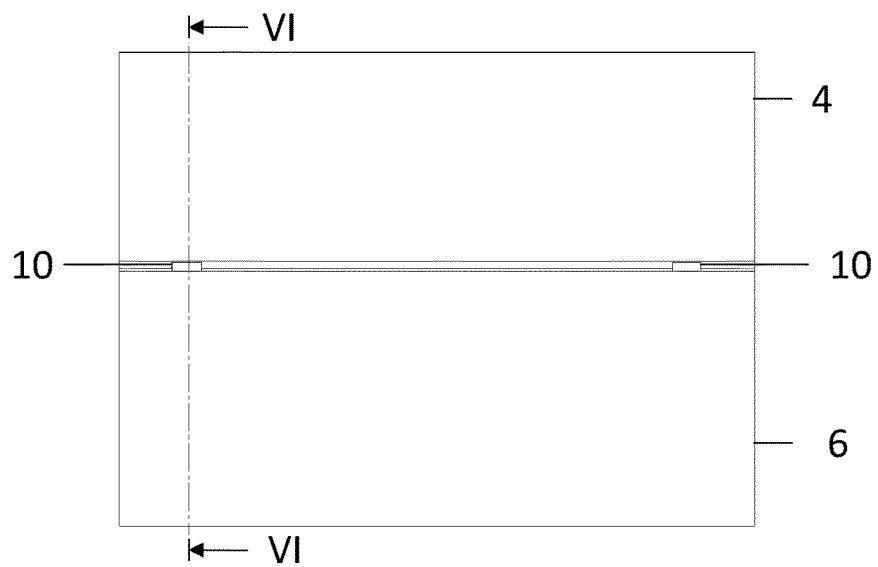
FIG. 4 is a side view of the wheel cover apparatus from FIG. 1.
Figure 5:
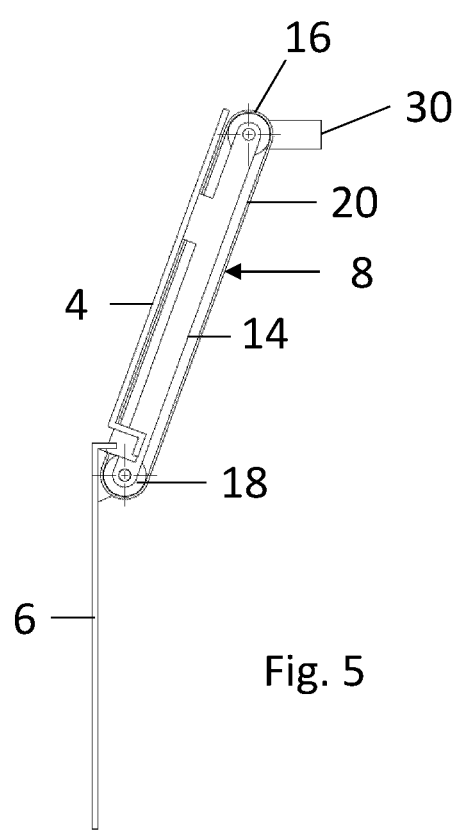
FIG. 5 is a rear view of the wheel cover apparatus from FIG. 1 without an adjusting device, the wheel cover apparatus having been pivoted.
Figure 6:
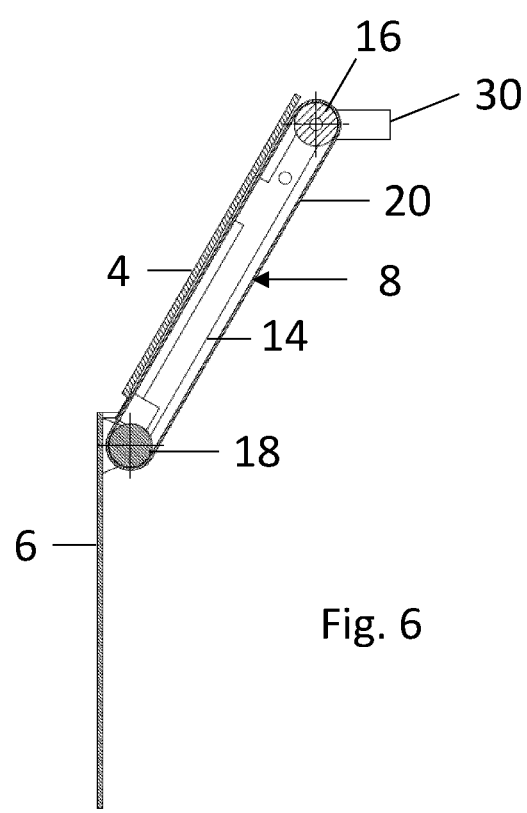
FIG. 6 is a sectional view along line VI-VI in FIG. 4.

FIGS. 4 to 6 show a subregion of the wheel cover apparatus 2 in an isolated illustration.

The wheel cover apparatus 2 comprises a left-hand wheel cover apparatus region, a right-hand wheel cover apparatus region and an adjusting device 22. The adjusting device 22 extends in a vehicle transverse direction and connects the left-hand wheel cover apparatus region to the right-hand wheel cover apparatus region.

The adjusting device 22 comprises a rotary actuator 24, a drive rod 26 and two drive-output rods 28. The drive rod 26 is arranged on the rotary actuator 24 in a rotationally fixed or rotationally rigid manner in such a way that it intersects an axis of rotation of the rotary actuator 24. A first of the drive-output rods 28 is rotatably connected at a first end to a first end of the drive rod 26. The second drive-output rod 28 is rotatably connected at a first end to the second end of the drive rod 26. Thus, forces which act in opposed fashion in the vehicle transverse direction are applied to the drive-output rods 28 by the drive rod 26. At the second end thereof, the drive-output rods 28 are connected to a connecting web 14 of the left-hand wheel cover apparatus region and, respectively, of the right-hand wheel cover apparatus region.

The left-hand wheel cover apparatus region and the right-hand wheel cover apparatus region are configured in a mirror-symmetrical manner with respect one another. The plane of symmetry extends in the vehicle longitudinal direction and in a vehicle vertical direction.

The left-hand wheel cover apparatus region and the right-hand wheel cover apparatus region each comprise an upper planar (areal) portion 4, a lower planar (areal) portion 6, the connecting web 14 and a positioning device 8.

The upper planar portion 4 is mounted on a body 30 of the vehicle by way of the connecting web 14 so as to be pivotable about a first pivot axis extending in the vehicle longitudinal direction.

The upper planar portion 4 and the lower planar portion 6 are connected to one another by way of hinges 10 so as to be pivotable about a second pivot axis.

The positioning device 8 comprises a first shaft 16, a second shaft 18 and a traction mechanism 20. The first shaft 16 is mounted on the body 30 in a rotationally fixed manner. The second shaft 18 is rotatably mounted on the upper planar portion 4 and connected to the lower planar portion 6 in a rotationally fixed manner. The traction mechanism 20 is arranged or tensioned on the first shaft 16 and the second shaft 18.

Upon actuation of the rotary actuator 24, the upper planar portions 4 are each subjected, by way of the connecting webs 14, to a force which acts in the vehicle transverse direction and which causes the connecting web 14 and the upper planar portion 4 to pivot about the first pivot axis. The force acting on the upper planar portion 4 of the left-hand wheel cover apparatus region acts in the opposite direction to the force acting on the upper planar portion 4 of the right-hand wheel cover apparatus region. The upper planar portion 4 of the left-hand wheel cover apparatus region is thus pivoted in a pivoting direction opposite to the pivoting direction of the upper planar portion 4 of the right-hand wheel cover apparatus region.

The pivoting of the upper planar portions 4 and of the connecting webs 14, on which a respective second shaft 18 is rotatably arranged, in turn causes, together with the first shafts 16, which are arranged on the body in a rotationally fixed manner, and the traction mechanisms 20, which are each tensioned on a respective one of the first shafts 16 and a respective one of the second shafts 18, a rotation of the second shafts 18. The second shafts 18 are each rotated in a direction of rotation opposite to the pivoting direction of the respective upper planar portion 4.

Due to the rotation of the second shafts 18, the lower planar portions 6, which are each arranged on a respective one of the second shafts 18 in a rotationally fixed or rigid manner, are also subjected to a pivoting action in the direction opposite to the pivoting direction of the respective upper planar portion 4.

The diameter of the first shafts 16 corresponds to the diameter of the second shafts 18. The pivot angle of the upper planar portions 4 is thus equal to the negative pivot angle of a respective one of the lower planar portions 6. In sum, a resulting pivot angle of zero degrees is therefore produced for the lower planar portions 6 in each case relative to the body.

LIST OF REFERENCE DESIGNATIONS

2 Wheel cover apparatus
4 Upper planar (areal) portion
6 Lower planar (areal) portion
8 Positioning device
10 Hinge
12 Steerable wheel
14 Connecting web
16 First shaft
18 Second shaft
20 Traction mechanism
22 Adjusting device
24 Rotary actuator
26 Drive rod
28 Drive-output rod
30 Body

The invention claimed is:

1. A wheel cover apparatus for a vehicle, comprising:
an upper planar portion for at least partially covering a wheel outer side of a steerable wheel, which is arranged at least partially in a wheel arch of the vehicle;
a lower planar portion for at least partially covering the wheel outer side of the steerable wheel;
an adjusting device for adjusting a position and/or orientation of the upper planar portion; and
a positioning device for positioning the lower planar portion, the positioning device being a traction mechanism drive, wherein
the upper planar portion is arrangeable on a body of the vehicle so as to be pivotable about a first pivot axis extending in a vehicle longitudinal direction,
the upper planar portion and the lower planar portion are connected to one another so as to be pivotable about a second pivot axis extending in the vehicle longitudinal direction, and
the upper planar portion is coupled to the adjusting device such that, in a functional installed state in the vehicle, the upper planar portion is movable relative to the wheel arch via the adjusting device.

2. The wheel cover apparatus according to claim 1, wherein
the positioning device comprises a first shaft, a second shaft, and a traction mechanism,
the first shaft is mountable on the body of the vehicle in a rotationally fixed manner,
the second shaft is connected to the lower planar portion in a rotationally fixed manner, and
the traction mechanism is arranged on the first shaft and the second shaft.

3. The wheel cover apparatus according to claim 2, wherein
a diameter of the first shaft corresponds to a diameter of the second shaft.

4. The wheel cover apparatus according to claim 2, wherein
the positioning device comprises a tensioning roller for tensioning the traction mechanism on the first shaft and the second shaft.

5. The wheel cover apparatus according to claim 4, wherein
the tensioning roller is rotatably mounted on the upper planar portion.

6. The wheel cover apparatus according to claim 2, wherein
the upper planar portion is pivotably mountable on the body of the vehicle via a connecting web, and
the second shaft is rotatably arranged on the connecting web.

7. The wheel cover apparatus according to claim 6, wherein
the connecting web is pivotably connectable at a first end to the body and the second shaft is arranged at the second end of the connecting web.

8. The wheel cover apparatus according to claim 6, wherein
the adjusting device is connected to the connecting web.

9. A vehicle, comprising:
a steerable wheel; and
a wheel cover apparatus according to claim 1, wherein
the wheel cover apparatus at least partially covers the wheel outer side of the steerable wheel, which is at least partially arranged in a wheel arch of the vehicle.

10. A method for operating a wheel cover apparatus of a vehicle, comprising:
a) detecting an operating state of the vehicle, in which the wheel cover apparatus of the vehicle comprises:
an upper planar portion for at least partially covering a wheel outer side of a steerable wheel, which is arranged at least partially in a wheel arch of the vehicle;
a lower planar portion for at least partially covering the wheel outer side of the steerable wheel;
an adjusting device for adjusting a position and/or orientation of the upper planar portion; and
a positioning device for positioning the lower planar portion, the positioning device being a traction mechanism drive, wherein
the upper planar portion is arrangeable on a body of the vehicle so as to be pivotable about a first pivot axis extending in a vehicle longitudinal direction,
the upper planar portion and the lower planar portion are connected to one another so as to be pivotable about a second pivot axis extending in the vehicle longitudinal direction, and
the upper planar portion is coupled to the adjusting device such that, in a functional installed state in the vehicle, the upper planar portion is movable relative to the wheel arch via the adjusting device;
b) determining whether pivoting of the upper planar portion of the wheel cover apparatus is required in dependence on the detected operating state of the vehicle; and
c) if yes, pivoting the upper planar portion by way of the adjusting device of the wheel cover apparatus.

* * * * *